(12) United States Patent
Kane

(10) Patent No.: US 7,083,174 B2
(45) Date of Patent: Aug. 1, 2006

(54) AUXILIARY WHEEL SET (KICK-BACK) ADAPTER FOR TWO-WHEELED HAND TRUCK

(76) Inventor: Gregory Kane, 3390 Prairie Ave., Eureka, CA (US) 95501

( * ) Notice: Subject to any disclaimer, the term of this patent is extended or adjusted under 35 U.S.C. 154(b) by 144 days.

(21) Appl. No.: 10/873,819

(22) Filed: Jun. 21, 2004

(65) Prior Publication Data

US 2004/0256816 A1    Dec. 23, 2004

Related U.S. Application Data

(60) Provisional application No. 60/479,699, filed on Jun. 19, 2003.

(51) Int. Cl.
*B62B 3/02* (2006.01)
(52) U.S. Cl. ............... 280/47.2; 280/47.16; 280/47.18; 280/47.27; 280/47.29; 280/47.33
(58) Field of Classification Search ............... 280/47.2, 280/47.18, 47.27, 47.29, 40, 645, 659, 47.16, 280/47.3; 414/490; 248/125.8, 129, 139; 403/187, 188, 346, 396; D34/24, 25, 26
See application file for complete search history.

(56) References Cited

U.S. PATENT DOCUMENTS

| | | | | |
|---|---|---|---|---|
| 2,361,674 A | * | 10/1944 | Zeindler | ...................... 254/3 C |
| 2,606,770 A | * | 8/1952 | Reichert | ...................... 280/641 |
| 3,578,353 A | * | 5/1971 | Lockhart | ................... 280/47.2 |
| 4,033,595 A | * | 7/1977 | Mauch | ....................... 280/5.22 |
| 4,630,837 A | * | 12/1986 | Kazmark | .................... 280/47.2 |
| 4,998,691 A | * | 3/1991 | Brown | ....................... 248/74.1 |
| 5,160,153 A | * | 11/1992 | Zan | ........................... 280/43.1 |
| 5,207,439 A | * | 5/1993 | Mortenson | ................. 280/47.2 |
| 5,427,469 A | * | 6/1995 | Galarnyk | ..................... 403/396 |
| 5,445,399 A | * | 8/1995 | Salvucci, Sr. | ............ 280/47.27 |
| 5,947,491 A | * | 9/1999 | Meier | .......................... 280/47.2 |
| 6,328,319 B1 | * | 12/2001 | Stahler, Sr. | .............. 280/47.18 |
| 6,341,788 B1 | * | 1/2002 | Ciccone | .................... 280/47.28 |
| 6,364,328 B1 | * | 4/2002 | Stahler, Sr. | .............. 280/47.18 |
| 6,454,232 B1 | * | 9/2002 | Roth | ....................... 248/228.1 |

* cited by examiner

*Primary Examiner*—Christopher P. Ellis
*Assistant Examiner*—John Walters
(74) *Attorney, Agent, or Firm*—Johnson & Stainbrook LLP; Craig M. Stainbrook; Larry D. Johnson

(57) ABSTRACT

An auxiliary wheel set adapted for aftermarket installation on two-wheeled hand trucks. The apparatus includes a right vertical support and left vertical support, each having a leg portion with an upper section and a lower end, and a shoulder at its upper portion from which an upper arm extends outwardly substantially perpendicular to the leg. Each upper arm terminates in a curved elbow which connects the upper arm to a lower arm which extends inwardly and substantially parallel to the upper arm. A spreader bar is welded between the vertical supports to provide bracing. Locking caster wheels are disposed on the respective lower ends of the legs. The lower arms are journalled in bushings, which are, in turn, removably installed onto the side rails of a hand truck with U-bolts attached to first and second integral pivot plates. The wheel set selectively pivots between a stored position and a deployed position.

13 Claims, 5 Drawing Sheets

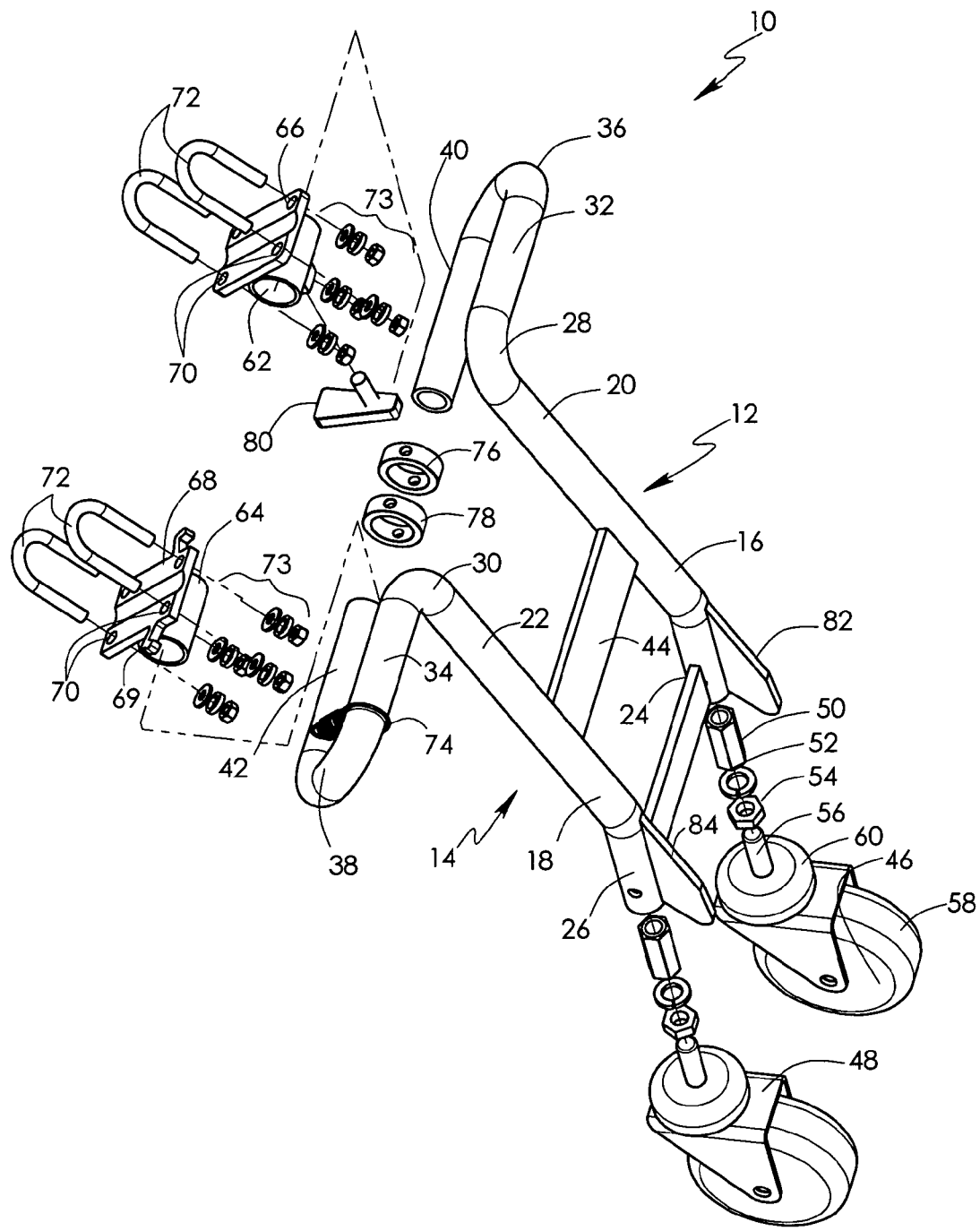
FIG._1

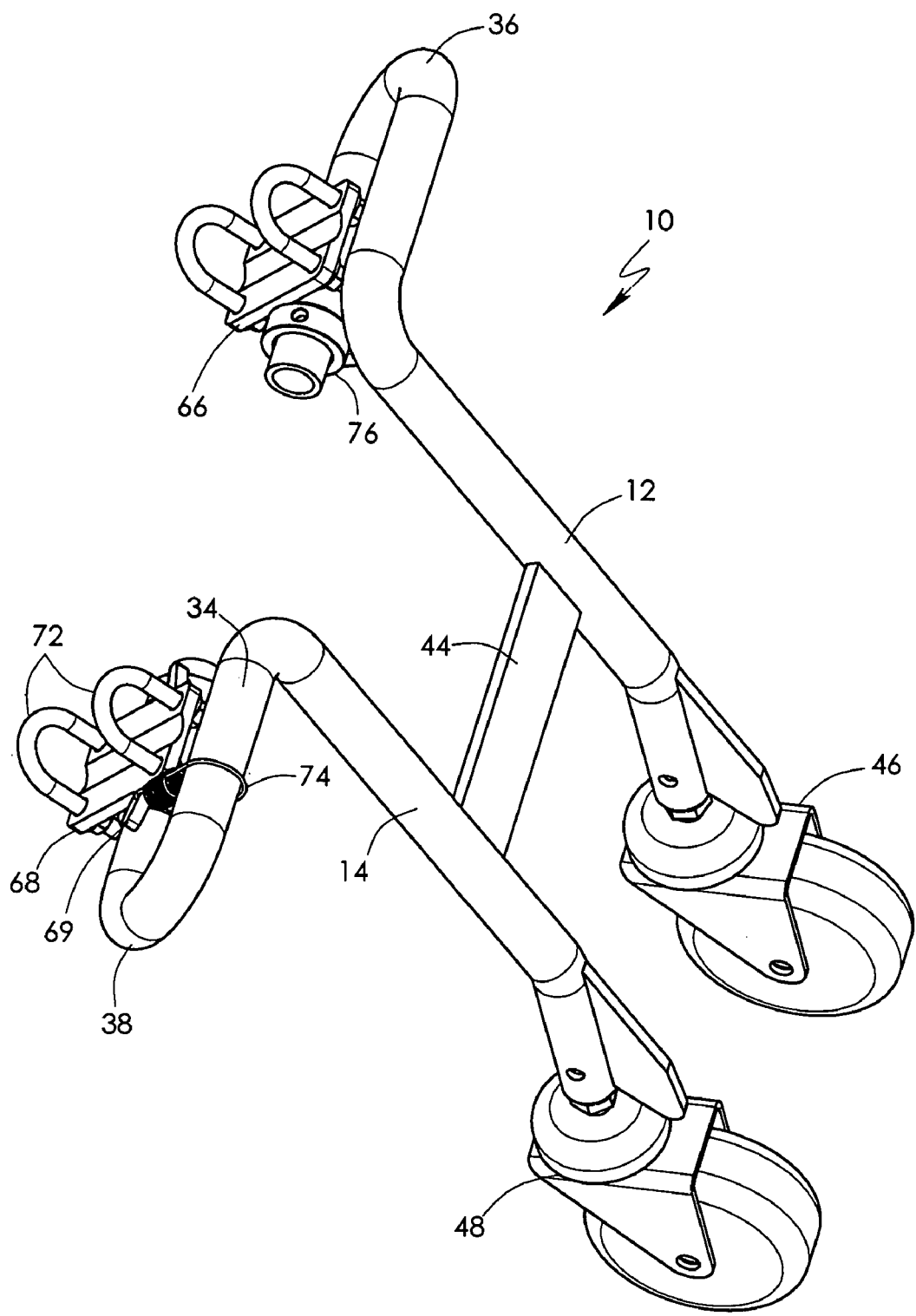
FIG._2

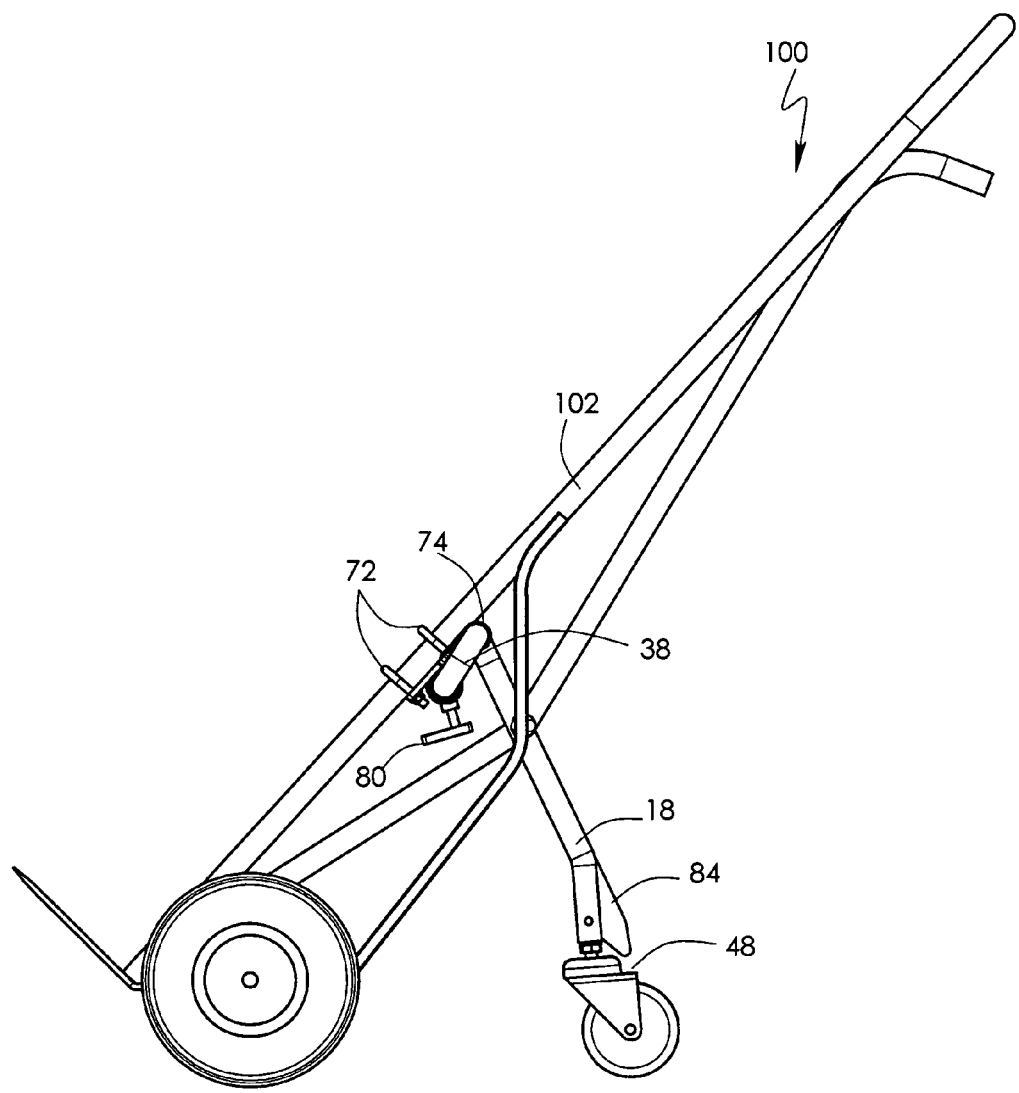
FIG._3

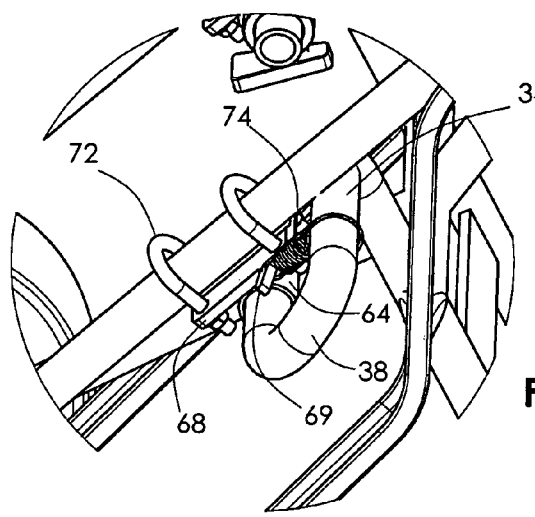
FIG._4A
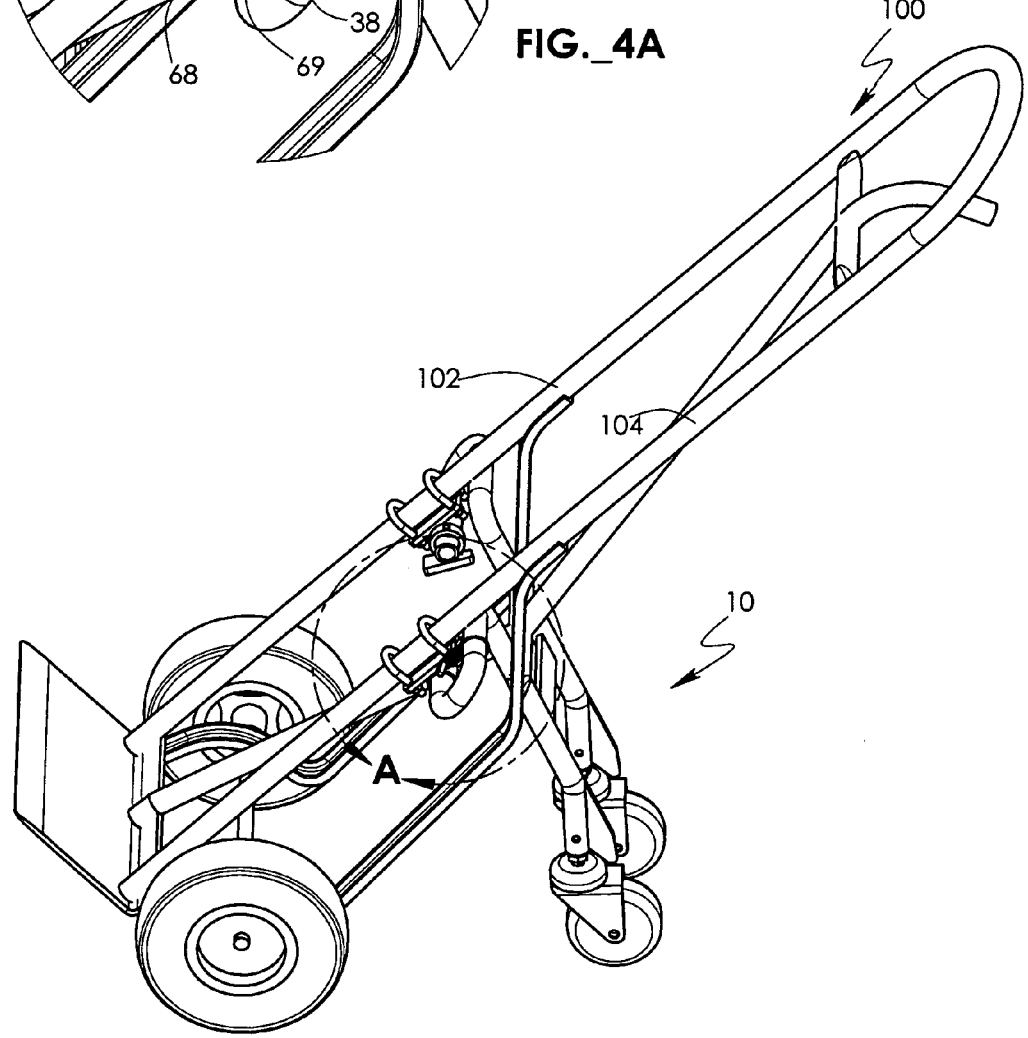
FIG._4

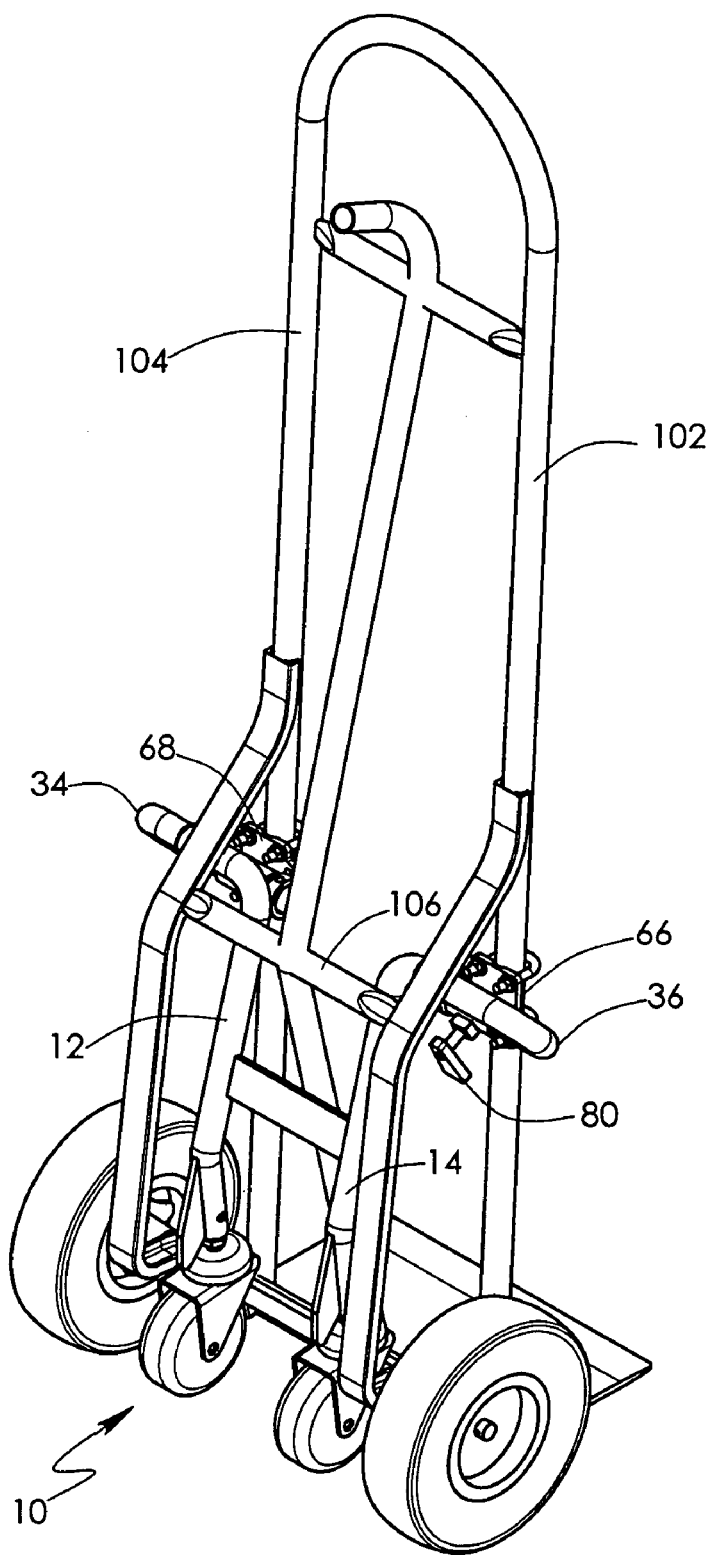
FIG._5

AUXILIARY WHEEL SET (KICK-BACK) ADAPTER FOR TWO-WHEELED HAND TRUCK

CROSS REFERENCE TO RELATED APPLICATIONS

The present application claims the benefit of the filing date of U.S. Provisional Patent Application Ser. No. 60/479,699, filed Jun. 19, 2003 (Jun. 19, 2003).

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to hand trucks, and more particularly to a retractable/extendable auxiliary wheel set adapted for installation on conventional hand trucks of varying sizes, said wheel set providing stabilization and support under heavy loads.

BACKGROUND INFORMATION AND DISCUSSION OF RELATED ART

Hand trucks are universally used as a means to carry small-sized heavy loads amenable to their use. Typically, a hand truck is intended for use by an individual, rather than team of persons. The truck is typically equipped with a set of two wheels, a single handle, and includes a pair of side rails with a bottom plate extending outwardly from the wheels as tongue and in a generally perpendicular relation to the side rails. The handle portion is generally integrally attached at the topmost portion of the side rails. In use, the bottom plate is slipped under a load and the load is tilted so as to bear upon both the bottom plate and the side rails. The hand truck can then be easily steered by the user. However, the maneuverability of the load is largely a function of the ease with which a two-wheeled truck can be pivoted or swivelled on its wheels, and this maneuverability also requires that the load pivot (or more accurately, rotate) about the wheel and toward the user, who then bears some of the load.

Thus, a disadvantage of using hand trucks rests not so much in their own load-bearing limitations, but in the load-bearing limitations of the users, which is to say that some loads are simply too heavy or too unwieldy for an individual to move with the hand truck. This limitation can be considerably extended if the load-bearing requirements of the user are removed or substantially removed.

To this end, some hand trucks have been equipped with permanent third wheels, or rear stabilizers. Exemplary patents include the following:

U.S. Pat. No. 4,033,595, to Mauch, discloses a hand truck having an auxiliary frame on its main frame. The auxiliary frame is adapted for adjustable mounting of a third wheel. The auxiliary frame is provided with a radius rod with an inner end pivotally attached to the lower end of the main frame. When the auxiliary frame is pulled outwardly it locks on the end of the radius rod. This enables the operator to place his foot on the cross-member of the auxiliary frame to assist in tilting the load about the main support wheels. In addition, the third wheel is spring loaded to extend below the auxiliary frame and its extension is made adjustable by a foot-operated lever; when depressed it frees the spring loaded third wheel permitting it to extend downwardly.

U.S. Pat. No. 5,947,491 to Meier, teaches a hand truck with brake elements actuable and releasable by foot operation of the user, for setting and releasing the brake. The brake may also be actuated by hand operation, but the hand operation will not set the brake. The brake elements include plates movable against a wheel to prevent the wheel from moving backwards or in the rear position. The apparatus of the present invention also includes a retractable pair of stabilizer wheels disposed on a stabilizer frame and movable to a down or use position and to an up and storage position, as desired. The stabilizer frame is secured to the main frame of the dolly and pivots thereon between a stowed position and a down, use position.

U.S. Pat. No. 6,328,319 to Stahler, Sr., et al, shows a hand truck convertible into a cart having an elevated tabletop surface. The hand truck has a primary frame with rotatably mounted wheels. The hand truck has at least one additional wheel adapted to allow the hand truck to be used as a cart. The primary frame is generally parallel to a supporting surface while the hand truck is being used as a cart. The improvement to the hand truck includes a plate movably attached to the primary frame and movable between a first position, generally parallel to and contacting the primary frame, and a second position, generally parallel to and spaced apart from the primary frame, forming the tabletop surface.

U.S. Pat. No. 4,630,837, to Kazmark, discloses a hand truck with an auxiliary wheel which can be moved between a storage position and a supporting position. When the auxiliary wheel is in the storage position, the cart can be used as a two-wheeled cart. When the auxiliary wheel is in the supporting position, the cart is supported on a three point stance and is self-supporting.

The foregoing patents notwithstanding, there is as of this date, and to the knowledge of the present inventors, no known auxiliary wheel set adapted for aftermarket installation on hand trucks of varying sizes to provide for rear stabilization and load support. It would be desirable, therefore, to provide such an apparatus with all the appurtenant objects and advantages. Accordingly, the foregoing patents reflect the current state of the art of which the present inventors are aware. Reference to, and discussion of, these patents is intended to aid in discharging Applicants' acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The auxiliary wheel set (kick-back) adapter for two-wheeled hand trucks of the present invention comprises vertical supports having leg sections with an upper portion and a lower end, a shoulder section from which an upper arm is disposed outwardly and substantially perpendicular to the leg portion. The upper arms extend to a curved elbow which connects the upper arm to a lower arm that extends inwardly and parallel to the upper arm. The vertical supports are braced by a spreader bar interposed between the leg portions.

Caster wheels are attached to the lower ends of the legs. The lower arms are journalled in bushings, or pivot tubes, integrally attached or welded to pivot plates, which are in turn adapted for connection to the side rails of a hand truck. Locking collars secure the lower arms in the pivot tubes and a helical tension spring places the wheel set under selected pressure to prevent unfettered movement between the extended (or deployed) and retracted (or stored) positions. Although not explicitly illustrated, the caster wheels employed in the present invention are locking casters that prevent the wheel set casters from rolling and thus provide a braking mechanism for the entire truck. The kicked-back position of the wheel set allows for easy brake application while under load without requiring the user to reach far forward toward the main wheels to apply brakes provided on those wheels.

It is therefore an object of the present invention to provide a new and improved auxiliary wheel set adapter for a two-wheeled hand truck that may be installed on a wide range of sizes of conventional hand truck.

It is another object of the present invention to provide a new and improved auxiliary wheel set for aftermarket installation on a hand truck that provides three point support for loads.

A further object or feature of the present invention is a new and improved auxiliary wheel set adapter for a two-wheeled hand truck that provides for automatic deployment and return to storage configuration.

An even further object of the present invention is to provide a novel auxiliary wheel set adapter for a two-wheeled hand truck that can be locked in either a stored or deployed configuration.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is an upper perspective exploded view of the wheel set adapter for two-wheeled hand trucks of the present invention;

FIG. 2 is an upper perspective view of the apparatus of FIG. 1;

FIG. 3 is a side view in elevation of the inventive apparatus installed on a two-wheeled hand truck and extended to its load-bearing (legs out) position;

FIG. 4 is an upper perspective view of the assembled kick back of FIG. 3;

FIG. 4A provides a detailed perspective view of the retraction spring installation and other assembly elements take along the lines shown in FIG. 4; and FIG. 5 is an upper perspective view of the inventive apparatus in the retracted or stored (legs in) position.

DRAWING REFERENCE NUMERALS 10 inventive apparatus generally
12 right vertical support
14 left vertical support
16 right leg portion
18 left leg portion
20 right upper portion
22 left upper portion
24 right lower end
26 left end
28 right shoulder
30 left shoulder
32 right upper arm
34 left upper arm
36 right elbow
38 left elbow
40 right lower arm
42 left lower arm
44 spreader bar
46 first swiveling caster wheel assembly
48 second swiveling caster wheel assembly
50 coupling hex nut
52 washer 54 hex nut
56 caster wheel shaft
58 wheel
60 pivot limiting ring
62 right pivot tube
64 left pivot tube
66 right pivot plate
68 left pivot plate
69 wings
70 apertures
72 U-bolts
73 nuts and washers
74 retraction spring
76 right locking collar
78 left locking collar
80 locking pin
82 right skid plate
84 left skid plate
100 hand truck
102 side rail
104 side rail
106 cross brace

DETAILED DESCRIPTION OF THE INVENTION

Referring to FIGS. 1 through 5, wherein like reference numerals refer to like components in the various views, FIG. 1 is an upper perspective exploded view of the wheel set (kick-back) adapter for two-wheeled hand trucks of the present invention, while FIG. 2 is an upper perspective view thereof. FIG. 3 is a side view in elevation of the inventive apparatus installed on a two-wheeled hand truck and extended to its load-bearing position, and FIG. 4 is an upper perspective view thereof. FIG. 5 is an upper perspective view of the inventive apparatus in the retracted position. FIG. 5 is a perspective view of an alternative embodiment of the leg assembly.

The foregoing views collectively illustrate that in a first and most essential aspect, the inventive apparatus 10 comprises a right vertical support 12 and a left vertical support 14, with respective right and left leg portions 16, 18, respective right and left upper portions 20, 22 and respective right and left lower ends 24, 26. The right vertical support includes a right shoulder 28 and the left vertical support includes a left shoulder 30, each disposed at the corresponding upper portion, from which a right upper arm 32 and left upper arm 34, respectively, are disposed outwardly and substantially perpendicular to the corresponding leg portion. The right and left upper arms terminate, respectively, in a right curved elbow 36, and a left curved elbow 38. The right curved elbow connects the right upper arm to a right lower arm 40, and the left curved elbow connects the left upper arm to a left lower arm 42. The lower arms bend, return, and extend inwardly in a substantially parallel fashion to the corresponding upper arm.

A spreader bar 44 is interposed between the leg portions of the right and left vertical supports and is preferably welded for structural integrity. First and second swiveling caster wheel assemblies 46, 48 are disposed one each on the respective lower ends of the legs. As will be readily appreciated, the vertical supports may be comprised of steel tubing, and each of the caster assemblies is thus preferably installed in the end of a vertical support tube with a coupling hex nut 50 inserted into the end of the tube, a washer 52 and a hex nut 54 which secure the caster wheel shaft 56, the wheel proper 58, and a pivot limiting ring 60, which ensures that the wheels do not swivel too freely and uncontrollably.

Right and left lower arms are journalled in right and left bushings (or pivot tubes) 62, 64, to which right and left pivot plates 66, 68 are integrally attached. At least one of the plates includes structure, preferably wings 69, angled away from an upper arm when the plate is installed on the lower arm and affixed to the side rail of a hand truck. The wing (or other fastening structure) provides means to secure one end of a retention spring 74, the other end of which is looped around the corresponding upper arm. Each pivot plate includes apertures 70 through which the ends of U-bolts 72 are inserted for securing the plates to a conventional hand truck 100 at its side rails 102, 104, using nuts and washers 73, or similar fastening means. A helical retraction spring 74 is installed on one side of the apparatus. The spring includes two looped ends, one of which is secured around wing 69, the other around the upper arm 34 of a vertical support member. This spring provides a predetermined amount of tension to regulate the ease or difficultly with which the wheel set moves between the extended and retracted positions. Right and left locking collars 76, 78 are placed over each of the lower arms after the arms are inserted through their respective bushing so that the arms are secured in place and will not migrate laterally during use.

One of the bushings 62, 64 may be provided with an aperture which aligns with a aperture in a lower arm 40, 42 (apertures not shown), such that a selectively removable locking pin 80 may be inserted to lock the wheel set in either the retracted or extended position.

Right and left skid plates 82, 84, are preferably integrally installed at the lower ends of their respective leg portions.

As will be readily appreciated, when the wheel set is in the extended position (see FIGS. 3 and 4), the outward movement of the apparatus is checked by the cross brace 106 of the hand truck (best seen in FIG. 5).

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An auxiliary wheel set adapted for aftermarket installation on two-wheeled hand trucks and having a stored position and a deployed position, said apparatus comprising:
   a right vertical support having a right leg portion with a right upper portion and a right lower end, a right arm portion connected to said right upper portion and extending inwardly and substantially perpendicular to said right leg portion;
   a left vertical support having a left leg portion with a left upper portion and a left lower end, a left arm portion connected to said left upper portion and extending inwardly and substantially perpendicular to said left leg portion;

bracing means interposed between said right and left vertical supports;

a first swiveling caster wheel assembly disposed on said right lower end of said right vertical support;

a second swiveling caster wheel assembly disposed on said left lower end of said left vertical support;

first pivot connection means to which said right arm portion is pivotally connected;

second pivot connection means to which said left arm portion is pivotally connected; and side rail connection means for removably installing said first and second pivot connection means on the side rails of a hand truck;

whereby said first and second pivot connection means and said side rail connection means cooperate to permit said right and left vertical supports to pivot between the stored and deployed positions.

2. The apparatus of claim 1, wherein said right arm portion comprises a right shoulder extending from said right upper portion; a right upper arm extending outwardly and substantially perpendicular to said right leg portion; a right lower arm extending inwardly and substantially parallel to said right upper arm; a right curved elbow having first and second ends and connected at its first end to said right upper arm and at its second end to said right lower arm; and wherein said left arm portion comprises a left shoulder extending from said left upper portion; a left upper arm extending outwardly and substantially perpendicular to said left leg portion; a left lower arm extending inwardly and substantially parallel to said left upper arm; a left curved elbow having first and second ends and connected at its first end to said left upper arm and at its second end to said left lower arm.

3. The apparatus of claim 1, wherein said bracing means is a cross brace.

4. The apparatus of claim 1, wherein said first and second pivot connection means comprise first and second pivot tubes.

5. The apparatus of claim 4, wherein said first and second pivot tubes are welded to first and second pivot plates, respectively.

6. The apparatus of claim 5, wherein said side rail connection means comprises means to clamp said first and second pivot plates to the side rails of a hand truck.

7. The apparatus of claim 4, further including right and left locking collars, said right locking collar installed on an end of said right arm portion to secure it within said pivot tube and to restrict lateral movement of said right arm portion; and wherein said left locking collars is installed on an end of said left arm portion to secure it within said pivot tube and to restrict lateral movement of said left arm portion.

8. The apparatus of claim 1, further including a locking pin for locking said apparatus in each of the stored and deployed positions.

9. The apparatus of claim 1, wherein said first and second vertical supports each include a skid plate at their respective lower ends.

10. An auxiliary wheel set adapted for aftermarket installation on two-wheeled hand trucks, said apparatus comprising:

a right vertical support having a right leg portion with a right upper portion and a right lower end, a right shoulder extending from said right upper portion, a right upper arm extending outwardly and substantially perpendicular to said right leg portion, said right upper arm terminating at one end in a curved elbow, and a right lower arm connected to said curved elbow at the other end, said right lower arm extending inwardly and substantially parallel to said right upper arm;

a left vertical support having a left leg portion with a left upper portion and a left lower end, a left shoulder extending from said left upper portion, a left upper arm extending outwardly and substantially perpendicular to said left leg portion, said left upper arm terminating at one end in a curved elbow, and a left lower arm connected to said curved elbow at the other end, said left lower arm extending inwardly and substantially parallel to said left upper arm;

a spreader bar interposed between and bracing said right and left vertical supports;

a first swiveling caster wheel assembly disposed on said right lower end of said right vertical support;

a second swiveling caster wheel assembly disposed on said left lower end of said left vertical support;

a first bushing into which said right lower arm is journalled;

a second bushing into which said left lower arm is journalled; and connection means for removably installing said bushings on the side rails of a hand truck, characterized in that said connection means permits said wheel set to pivot between a retracted position and an extended position.

11. The auxiliary wheel set apparatus of claim 10, wherein said bushings comprise pivot tubes, and wherein said connection means comprises:

first and second pivot plates integral with said first and second bushings, respectively, each of said plates having at apertures through which the ends of U-bolts may be inserted and secured by nuts to the side rail of a hand truck so that said plate is approximated to the side rail; and a pivot tube locking collar slidably inserted over the end of said lower arm to secure said lower arm in said pivot tube.

12. The auxiliary wheel set of claim 11, wherein said connection means further includes at least one helical tension spring installed around one of said upper arms and having ends connected to an arm of a U-bolt, said spring adapted to hold said auxiliary wheel set in tension so that said auxiliary wheel set does not move between the retracted and extended without manual force.

13. The auxiliary wheel set of claim 10, further including a lock to selectively lock said auxiliary wheel set in either the retracted or extended positions.

* * * * *